United States Patent
Tsantrizos et al.

(10) Patent No.: US 10,053,379 B1
(45) Date of Patent: Aug. 21, 2018

(54) DEVICE FOR WASTEWATER PURIFICATION

(71) Applicant: PROTERRGO INC., Montreal (CA)

(72) Inventors: Panayotis G. Tsantrizos, Montreal (CA); Valérie Léveillé, Montreal (CA); Nicole A. Poirier, Beaconsfield (CA); Roy Richard, Natick, MA (US)

(73) Assignee: PROTERRGO INC., Montreal (CA)

( * ) Notice: Subject to any disclaimer, the term of this patent is extended or adjusted under 35 U.S.C. 154(b) by 46 days.

(21) Appl. No.: 15/434,698

(22) Filed: Feb. 16, 2017

(51) Int. Cl.
| | |
|---|---|
| *C02F 1/461* | (2006.01) |
| *C02F 1/463* | (2006.01) |
| *C02F 1/465* | (2006.01) |
| *C02F 103/00* | (2006.01) |
| *C02F 101/30* | (2006.01) |
| *C02F 101/32* | (2006.01) |

(52) U.S. Cl.
CPC .............. *C02F 1/463* (2013.01); *C02F 1/465* (2013.01); *C02F 1/46109* (2013.01); *C02F 2001/46119* (2013.01); *C02F 2101/301* (2013.01); *C02F 2101/325* (2013.01); *C02F 2103/002* (2013.01); *C02F 2103/005* (2013.01); *C02F 2103/008* (2013.01); *C02F 2201/4611* (2013.01)

(58) Field of Classification Search
CPC ........................................... C02F 1/463–1/465
See application file for complete search history.

(56) References Cited

U.S. PATENT DOCUMENTS

| | | |
|---|---|---|
| 4,123,341 A | 10/1978 | Gnieser |
| 5,928,493 A | 7/1999 | Morkovsky et al. |
| 6,902,678 B2 | 6/2005 | Tipton |
| (Continued) | | |

FOREIGN PATENT DOCUMENTS

| | | |
|---|---|---|
| CA | 2747555 A1 | 9/2010 |
| CN | 2212005 Y | 11/1995 |
| (Continued) | | |

OTHER PUBLICATIONS

International Search Report, PCT/CA2018/050127, dated May 1, 2018.

(Continued)

*Primary Examiner* — Bryan D. Ripa
*Assistant Examiner* — Ho-Sung Chung
(74) *Attorney, Agent, or Firm* — Gwendoline Bruneau

(57) ABSTRACT

An integrated device for wastewater purification, comprising a coagulation zone; a flocculation zone connected to and in fluid communication with the coagulation zone; a flotation zone connected to and in fluid communication with the flocculation zone and comprising a froth discharge port; and a separation zone below and in fluid communication with the flotation zone and comprising a contaminant separator and a purified wastewater discharge port; the wastewater entering the device being mixed with electrolytically-generated coagulants and gas bubbles in the coagulation zone; the flocculation zone receiving and gently mixes coagulated wastewater contaminants and gas bubbles formed in the coagulation zone and aggregating them into flocs before flotation of buoyant flocs in the flotation zone and the separation zone being adapted for further floc formation, oil coalescence, settling and discharge of non-buoyant contaminants.

13 Claims, 10 Drawing Sheets

(56) References Cited

U.S. PATENT DOCUMENTS

| | | |
|---|---|---|
| 7,087,176 B2 | 8/2006 | Gravel et al. |
| 7,169,301 B2 | 1/2007 | Vion |
| 8,097,145 B2 | 1/2012 | Polnicki et al. |
| 2007/0017874 A1* | 1/2007 | Renaud .................. C02F 1/20 210/703 |
| 2012/0138482 A1 | 6/2012 | Fanfan et al. |
| 2013/0180857 A1 | 7/2013 | Heffernan et al. |

FOREIGN PATENT DOCUMENTS

| | | |
|---|---|---|
| EP | 0347813 A1 | 12/1989 |
| WO | 2010096891 A | 9/2010 |
| WO | 2012024759 A1 | 3/2012 |
| WO | 2013158795 A1 | 10/2013 |
| WO | 2015079211 A1 | 6/2015 |

OTHER PUBLICATIONS

Rodriguez J, Stopić S, Krause G, Friedrich B (2007). "Feasibility Assessment of Electrocoagulation Towards a New Sustainable Wastewater Treatment." Environmental Science and Pollution Research 14 (7), pp. 477-482.

Lai, C. L. and Lin, S. H.,, "Treatment of chemical mechanical polishing wastewater by electrocoagulation: system performances and sludge settling characteristics", Chemosphere 54 (3), Jan. 2004, pp. 235-242.

Rincón G. and La Motta E., 2014, "Simultaneous removal of oil and grease, and heavy metals from artificial bilge water using electro-coagulation/flotation", Journal of Environmental Management, 144 (2014), pp. 42-50.

McKay Creek Technologies Ltd, "New electrocoagulation process treats emulsified oily wastewater at Vancouver Shipyards", Environmental Science & Engineering—Jan. 2003, https://esemag.com/archive/0103/electro.html.

OilTrap ElectroPulse System, "Marina Bay on Boston Harbor Water-treatment system by OilTrap Environmental", Oct. 2015, presentation from Electropulse, slide No. 7.

Solvin Serep, Technical Brochure, Jul. 2007, pp. 1-4, http://www.serep.fr.

http://oileclear.com/Project-Results, Feb. 17, 2017.

http://www.westmatic.org/sites/default/files/produkter/dokument/renaren_en.pdf, Aug. 23, 2016.

* cited by examiner

| | Wastewater trial number | Parameter | Untreated wastewater | Treated wastewater | Removal |
|---|---|---|---|---|---|
| Present invention | FOB12-2 (military base sewage) | BOD*(ppm) | 1168 | 505 | 57% |
| | | COD (ppm) | 2336 | 1010 | 66% |
| | | TSS (ppm) | 580 | 69 | 88% |
| | FOB13-3 (military base sewage) | BOD*(ppm) | 1426 | 479 | 66% |
| | | COD (ppm) | 2852 | 958 | 66% |
| | | TSS (ppm) | 800 | 97 | 88% |
| | S43-FOB-4 (military base sewage) | BOD*(ppm) | 985 | 300 | 70% |
| | | COD (ppm) | 1969 | 600 | 70% |
| | | TSS (ppm) | 255 | 36 | 86% |
| | S43-FOB-5 (military base sewage) | BOD*(ppm) | 1064 | 325.5 | 69% |
| | | COD (ppm) | 2127 | 651 | 69% |
| | | TSS (ppm) | 290 | 48 | 83% |
| | S43-FOB-20 (military base sewage) | BOD*(ppm) | 812 | 211 | 74% |
| | | COD (ppm) | 1624 | 422 | 74% |
| | | TSS (ppm) | 236 | 29 | 88% |
| | | | | BOD removal average: | 67% |
| | | | | COD removal average: | 69% |
| | | | | TSS removal average: | 87% |

FIG. 9

| Trial number treatment unit | Parameter (ppm) | Untreated oily water | Treated oily water | % Removal |
|---|---|---|---|---|
| 1 | EOG | 1190 | 1.9 | 99.8% |
| 2 | EOG | 2660 | 5.3 | 99.8% |

FIG. 10

DEVICE FOR WASTEWATER PURIFICATION

STATEMENT REGARDING FEDERALLY SPONSORED RESEARCH OR DEVELOPMENT

This invention was made in part with Government support contract #: ONR N00014-11-c-0166, ONR N00014-13-C-0218 and ONR N00014-14-P-1223 awarded by the US Office of Naval Research; and contract #: W56HZV-12-C-0438 awarded by the US Department of the Army.

FIELD OF THE INVENTION

The present invention relates to wastewater purification. More specifically, the present invention is concerned with a device for electrochemical wastewater purification.

BACKGROUND OF THE INVENTION

Electrochemical processes and more specifically the electrocoagulation process are known since 1906, when A. E. Dietrich patented the first electrocoagulation process for the treatment of bilge oily water from ships. Treatment of wastewater by electrocoagulation has been practiced for most of the 20th century with increasing popularity. In the last decade, electrocoagulation has been increasingly used in the United States, South America and Europe for the treatment of industrial wastewater containing metals. In North America, electrocoagulation has been used primarily to treat wastewater from pulp and paper industries, and mining and metal-processing industries. Recently, electrocoagulation was applied to treat wastewater containing food wastes, oily wastes, dyes and ink, chemical and mechanical polishing wastes, organics in landfill leachates, and effluents containing fluoride and synthetic detergent.

Current electrocoagulation devices are typically used in combination with additional devices performing required steps of the purification process such as contaminant coagulation, flocculation, and separation from the treated effluent.

Limitations of electrocoagulation, as it is performed today and that prevent it from wide commercial use for treating contaminated wastewater such as sewage, bilge water, and industrial wastewater include, for example, passivation of the electrode surfaces; inability to treat concentrated wastewater without a large number of electrodes or high electrode surface areas and long hydraulic residence times, due to the need to use low current densities to prevent passivation in the absence of continuous electrode cleaning mechanisms; build-up of sludge inside the treatment vessel leading to blockages and short circuits, which requires stopping the process in order to clean the vessel; inability to operate on marine vessels due to vessel motions such as vibration, roll and pitch which can affect hydrodynamics and alter the electrocoagulation process efficiency; inability to maintain a constant and small inter-electrode gap in order to operate at a constant and low voltage; inability to treat the entire wastewater stream due to hydraulic short circuiting or dosage of only a portion of the stream with the electrolytically-generated coagulant, and necessity to add one or more unit operations after the electrocoagulation process in order to complete the desired wastewater treatment and separate purified wastewater from contaminants.

There is still a need in the art for an optimized device for electrochemical wastewater purification.

The present description refers to a number of documents, the content of which is herein incorporated by reference in their entirety.

SUMMARY OF THE INVENTION

More specifically, in accordance with the present invention, there is provided an integrated device for wastewater purification, comprising a coagulation zone, comprising a feed port for the wastewater to enter the device; a flocculation zone connected to and in fluid communication with the coagulation zone; a flotation zone connected to and in fluid communication with the flocculation zone and comprising a froth discharge port; and a separation zone below and in fluid communication with the flotation zone and comprising a contaminant separator and a purified wastewater discharge port; wherein the wastewater entering the device through the feed port is mixed with electrolytically-generated coagulants and gas bubbles in the coagulation zone; the flocculation zone receives and gently mixes coagulated wastewater contaminants and gas bubbles formed in the coagulation zone and aggregates them into flocs before flotation of buoyant flocs in the flotation zone; the separation zone being adapted for further floc formation, oil coalescence, settling and discharge of non-buoyant contaminants.

There is further provided a marinarized integrated device for onboard wastewater purification, comprising a coagulation zone with a feed port for the wastewater to enter the device; a flocculation zone connected to and in fluid communication with the coagulation zone; a flotation zone connected to and in fluid communication with the flocculation zone; and a separation zone below and in fluid communication with the flotation zone and comprising a contaminant separator and a purified wastewater discharge port; wherein the annular flocculation zone is a narrow chamber extending up from the coagulation zone; the flotation zone comprises a floc collection cone, the flocs being periodically discharged from the collection cone; and the separation zone comprises a series of concentric and truncated upward pointing cones, below the flotation zone.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 9 shows characteristics of the wastewater before and after treatment and the contaminant removal rate using a method according to an embodiment of an aspect of the present invention; and FIG. 10 shows the emulsified oil and grease (EOG) concentration in oily wastewater before and after treatment and the EOG removal rate according to an embodiment of an aspect of the present invention.

DESCRIPTION OF ILLUSTRATIVE EMBODIMENTS

The present invention is illustrated in further details by the following non-limiting examples.

Figure 1:
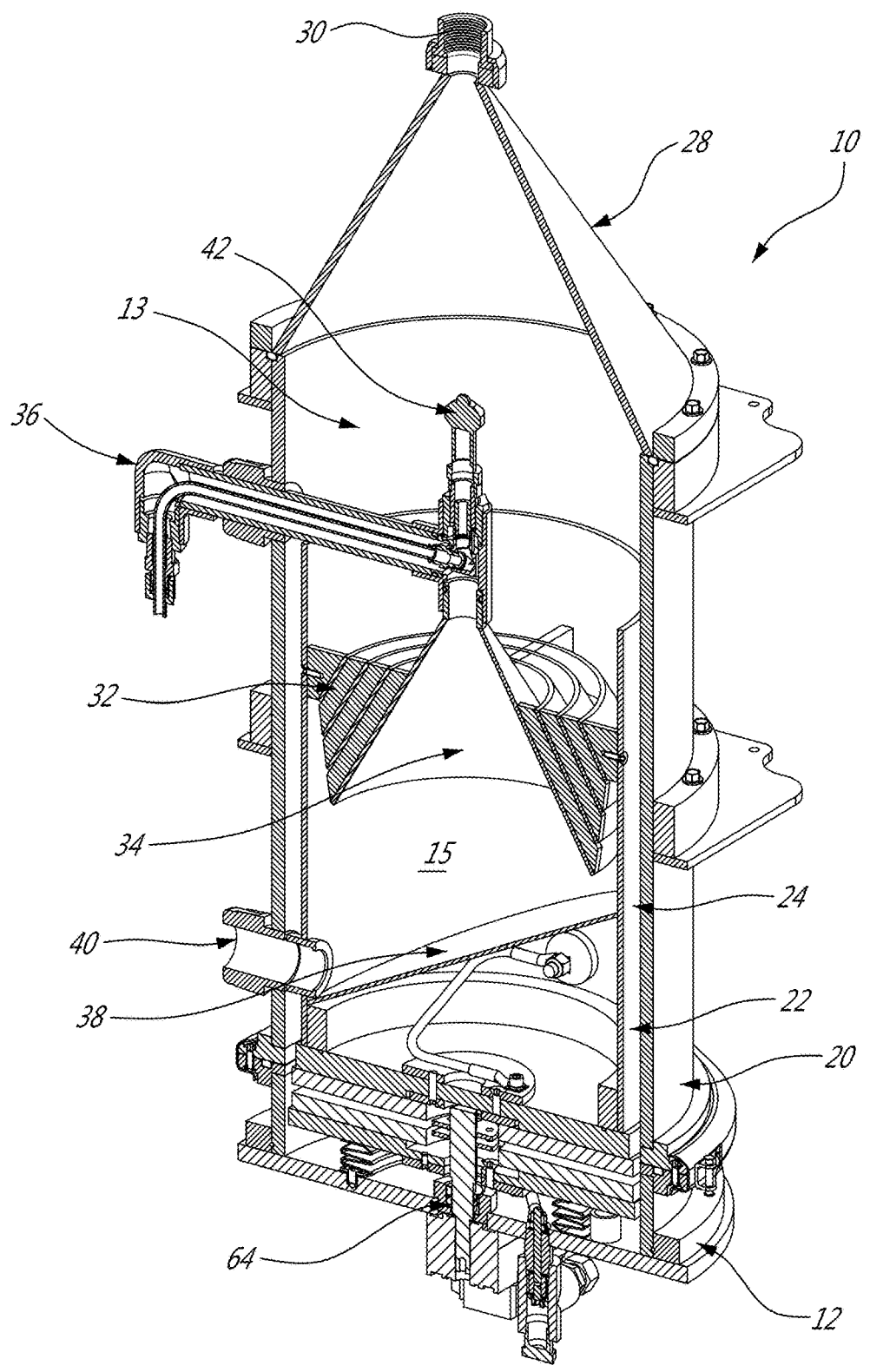
FIG. 1 is a cut-away view of a device according to an embodiment of an aspect of the present invention.
Figure 2:
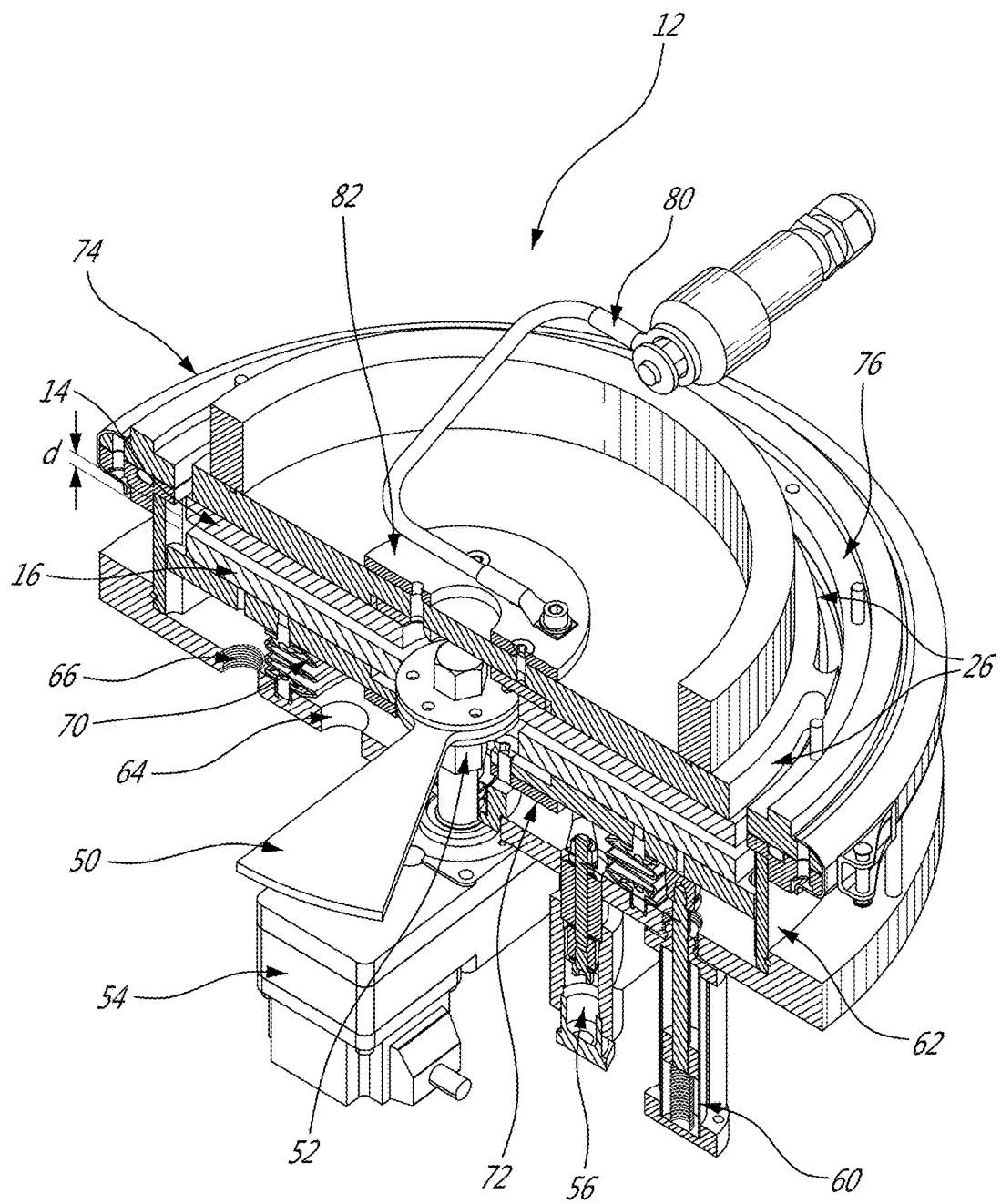
FIG. 2 is a cut-way view of an electrode section of the device of FIG. 1 according to an embodiment of an aspect of the present invention.

A device 10 according to an aspect of an embodiment of the invention is illustrated in FIGS. 1 and 2. As illustrated, the device 10 comprises a body of a generally cylindrical shape, formed by an outer 20 cylinder capped at a top end thereof by a cone 28.

The device 10 generally comprises a coagulation zone 12, a flocculation zone 24, a flotation zone 13 and a separation zone 15.

The coagulation zone, shown for example in FIG. 2, comprises disc-shaped electrodes 14, 16, i.e. an anode and a cathode, facing one another and separated by an inter-electrode gap d, and positioned perpendicular to the walls of the body of the device 10, at a bottom end thereof. The electrode acting as the anode is a sacrificial electrode, in aluminium or iron for example. As described hereinbelow, the wastewater received within the coagulation zone 12 through an entry port 64 is rapidly mixed therein with electrolytically-generated coagulants and gas bubbles.

An inner cylinder 22, concentric with the outer cylinder 20, defines, between parallel facing surfaces of the inner cylinder 22 and the outer cylinder 20, an annular narrow chamber extending up from the coagulation zone 12.

This annular narrow chamber forms the flocculation zone 24, connected to and in fluid communication with the coagulation zone 12, in continuity with annular gaps 26 provided at the outer edges of the electrodes 14, 16. As described hereinbelow, the flocculation zone 24 receives coagulated wastewater contaminants and gas bubbles formed in the coagulation zone 12.

The flotation zone 13 is located at the top of the flocculation chamber 24, in fluid communication with the flocculation chamber 24, for flotation of buoyant coagulated and flocculated wastewater contaminants, such as oil and particles for example. As described hereinbelow, the flotation zone 13 comprises a froth discharge port 30 at a top part thereof.

Wastewater is made to enter the device 10 at a feed port 64 at a bottom thereof, using a feeding pump for example, and then to flow radially in the inter-electrode gap d between the electrodes 14, 16 of the coagulation zone 12 toward the annular gaps 26, and then up into the flocculation chamber 24.

Upon application of an electric potential to the electrodes, multivalent metal ions are released from the anode, and hydrogen micro-bubbles are released at the cathode with hydroxide ions. The multivalent metal ions destabilize colloidal suspensions and emulsions in the wastewater.

The inter-electrode gap d is selected to form a confined space that generates an intense vigorous electrolytic bubbling, resulting in rapid mixing, i. e. enough turbulence, to rapidly and completely mix the metal ions released from the anode and the wastewater flowing radially therethrough in a matter of seconds, typically 5 s±50% of residence time, thereby promoting coagulation. This residence time is much shorter than the 30-180 seconds typically used in the rapid mixing stage of conventional wastewater treatment systems and methods where chemical coagulants, such as aluminum sulfate, aluminum chloride, ferric sulfate and ferrous sulfate for example, are added to the wastewater and then mixed. There are several factors which may explain this difference; chemical coagulants must first be hydrolyzed before they can serve to coagulate, while electrolytic coagulants are liberated in ready-to-use ionic form; as well, the bubbling, radial flow and shear forces that occur in the inter-electrode gap of the present system result in unexpectedly effective and rapid mixing. An inter-electrode gap d of 5 mm is found to result in this effective mixing and minimises the system electrical resistance. A gap d of 4 mm or even 3 mm could be used. Gaps larger than 5 mm might not be cost-effective since it would unnecessarily increase the electrical consumption unless the electrical conductivity of the wastewater to be treated is elevated, such as for instance at least 5 mS/cm.

The annular gaps 26 ensure a peripheral distribution and continuous transfer of the coagulated contaminants and hydrogen bubbles to the flocculation chamber 24 while minimizing hydrogen bubble coalescence such as would occur if wastewater was transferred using pipe or conduit from the coagulation zone 12 to a flocculation or flotation zone.

The flocculation chamber 24 provides flow conditions that allow gentle mixing and upward vertical flow of coagulated particles and hydrogen bubbles, with, for example, 115 seconds±50% of residence time for the bulk flow, although some hydrogen bubbles may have significantly lower or higher residence times than this depending on their size, leading to conditions suitable for coagulated contaminants to form micro-flocs and then flocs by the time they exit the flocculation chamber 24. This bulk flow residence time is much shorter than the flocculation time of 15-60 minutes or more typically used in conventional wastewater treatment systems and methods using baffled chambers or rotating blades, frequently assisted by polymeric flocculants added to aid with flocculation. There are several factors which may explain this difference; orthokinetic flocculation is primarily dependent on induced velocity gradients and time of flocculation, and it was found that the narrow annulus of the flocculation chamber of the present system coupled with the gentle mixing provided by the rising gas bubbles provides an optimal arrangement for effective flocculation.

The flocculation chamber 24 prevents the undesired coalescence of electrolytically-generated hydrogen micro-bubbles, so that they remain available and attach to the developing flocs consisting of coagulant and contaminants, rendering them buoyant. As a result, once exiting the flocculation chamber 24 into the flotation zone 13, the flocs rapidly float to the surface of the liquid and can then be separated from the wastewater being treated. This flotation is far more rapid than gravity-based sedimentation which is often used in conventional wastewater treatment systems and methods to separate flocs from the treated effluent. Flotation is dependent on the availability of a large number of micro-bubbles as opposed to fewer bubbles of larger size, and the present system makes use of a current density and has a configuration allowing operating conditions that generate and maintain sufficient micro-bubbles for extremely effective and rapid flotation of the flocs created in the flocculation zone.

Once exiting the flocculation chamber 24 into the flotation zone 13, the flocs float to the surface of the liquid and can then be separated from the wastewater being treated. The relatively high current density used in the present invention, for example between 30 and 70 A $mA/cm^2$, results in a rapid and complete flotation of the coagulated, flocculated contaminants. Some of the metallic ions also react with hydroxyl ions to produce metal hydroxides and complexes with many organic species. By means of attached micro-bubbles, these can be floated upwards as well.

In the flotation zone 13, located above the flocculation chamber 24, the flocs continue to form on their way up to the floc collection cone 28 capping the device 10, while the treated effluent flows downwards. The flocs are periodically discharged, based on the depth of the floc floating layer in the collection cone 28 for example, through the discharge port 30.

In fluid communication with and below the flotation zone 13, the separation zone 15 comprises a separator 32 and a purified wastewater discharge port 36.

The separator 32, comprising a series of concentric and truncated upward pointing cones, below the flotation zone 13, is used to separate non-buoyant contaminants: it receives small particles, which may include micro-flocs, particulates or emulsified constituents that are entrained downwards between the parallel surfaces of the upward pointing cones by the downward flowing wastewater, allowing them to aggregate so that they may either float upwards towards the floc collection cone 28, for example in the case of emulsified oil droplets with a specific density less than 1, or settle downwards towards a sludge collector 38.

A purified wastewater discharge cone 34 directs the purified wastewater (effluent) to the discharge port 36, while the sludge collector 38, which is shown as an inclined plate located below the effluent discharge cone 34 and covering the entire cross-sectional area of the inner cylinder of body of the device 10 in FIG. 1, collects heavy sludge and particles and directs them to a sludge discharge port 40.

The flotation zone 13 may include a spray nozzle 42, which is periodically used in order to clean the inside of the device 10 from debris deposited onto the inner surface of the flotation zone 13 and floc collection cone 28.

The coagulation zone 12 illustrated for example in FIG. 2 comprises a bottom part and a top part, clamped together using a clamp 74 or bolted together for example.

The bottom part supports the bottom electrode 16, a wiper blade assembly 50, 52, 54, spring housings and springs 60, the feed port 64, a recirculation port 66, and a bottom electrical connection 56 to an electrode mounting plate 72.

The top part of the coagulation zone 12 comprises the top electrode 14, a top plate 76, the annular gaps 26 discussed hereinabove, a top electrical connection 80, and an electrode mounting plate 82.

The top electrode 14 may be fixed while the bottom electrode 16 may be mounted on springs, located in the housings 60 or bare springs, so as to maintain an upward pressure on the bottom electrode 16, on the wiper blade 50 and on the upper electrode 14 in order to keep a constant inter-electrode gap d as both electrodes 14, 16 wear down, i.e. as their thickness diminishes upon the action of an imposed potential and the action of the reversal of the polarity of the electrical voltage.

The wiper blade rotation within the inter-electrode gap allows a continuous displacement of the electrolytic bubbles, i.e. mainly hydrogen bubbles, in the inter-electrode gap, thereby preventing their coalescence, which is not desirable since larger bubbles might render the flotation process less effective.

Figure 3:
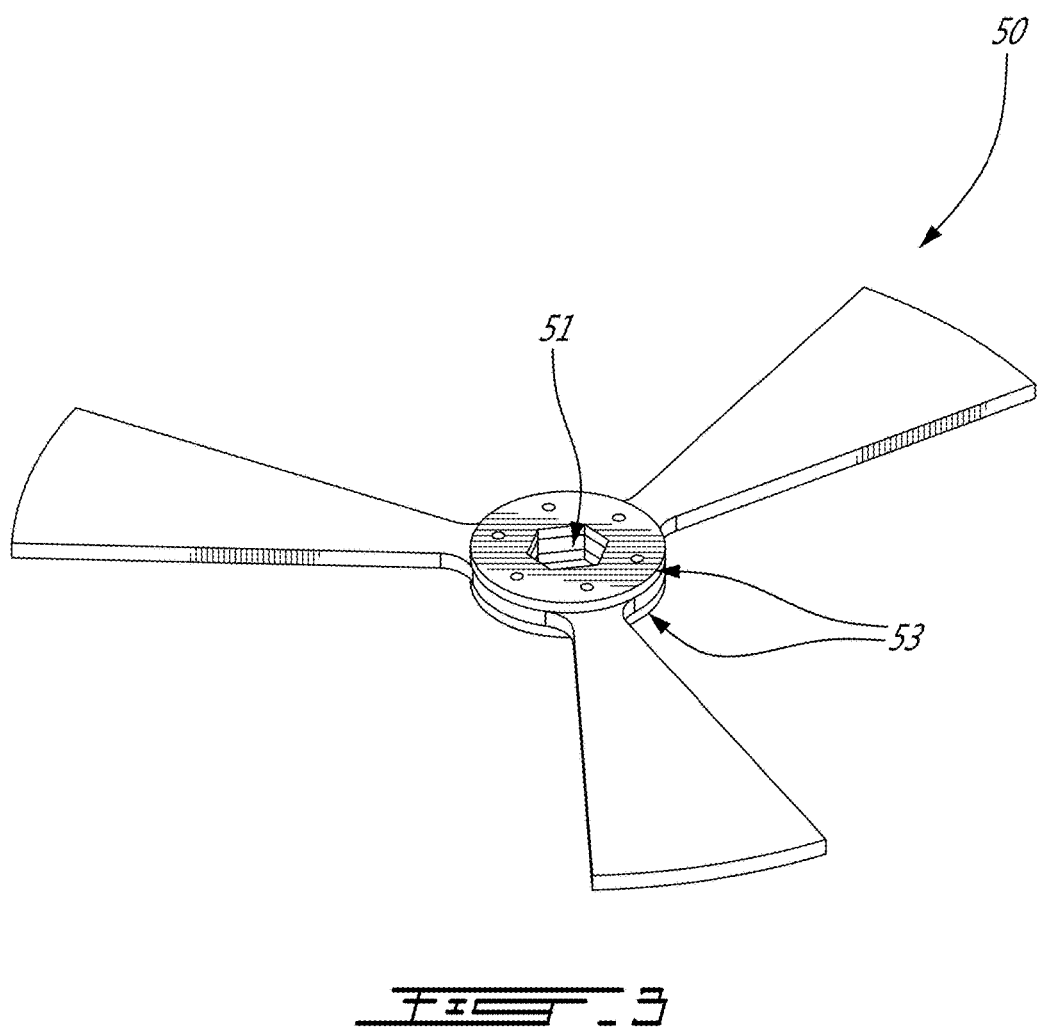
FIG. 3 shows a wiper blade used in an electrode section according to an embodiment of an aspect of the present invention.

A fan-shaped wiper blade arrangement consisting of three blades 50 for example as illustrated in FIG. 3, activated within the inter-electrode gap d by a rotating mechanism (shaft 52, motor 54), is used to wipe the facing surfaces of the electrodes 14, 16, thereby preventing passivation of the electrodes. The blades may be fan-shaped i. e. radially tapered as will be discussed hereinbelow in relation to FIG. 3, in order to provide a uniform distribution of the current density along the radius of the electrodes 14, 16, thereby promoting a uniform electro-dissolution of the material of the electrodes. The thickness of the blades can be varied in order to vary the inter-electrode gap d. By using a reversible motor 54, the rotational direction of the blades about their shaft 52 may be reversed periodically so as to prevent accumulation of deposits on the blade 50 edges not in contact with the surface of the electrodes 14, 16.

As described hereinabove, wastewater enters by the entry port 64 and first flows within the coagulation zone 12 between the electrodes 14, 16 in the inter-electrode gap d where a uniform mixing of the electro-chemically generated coagulants and wastewater contaminants is caused by hydrogen bubble evolution and other means. The coagulated contaminants and background fluid outflow in the annular gaps 26, which gaps allow maintaining a uniform flow distribution and minimize hydrogen bubble coalescence.

Figure 6:
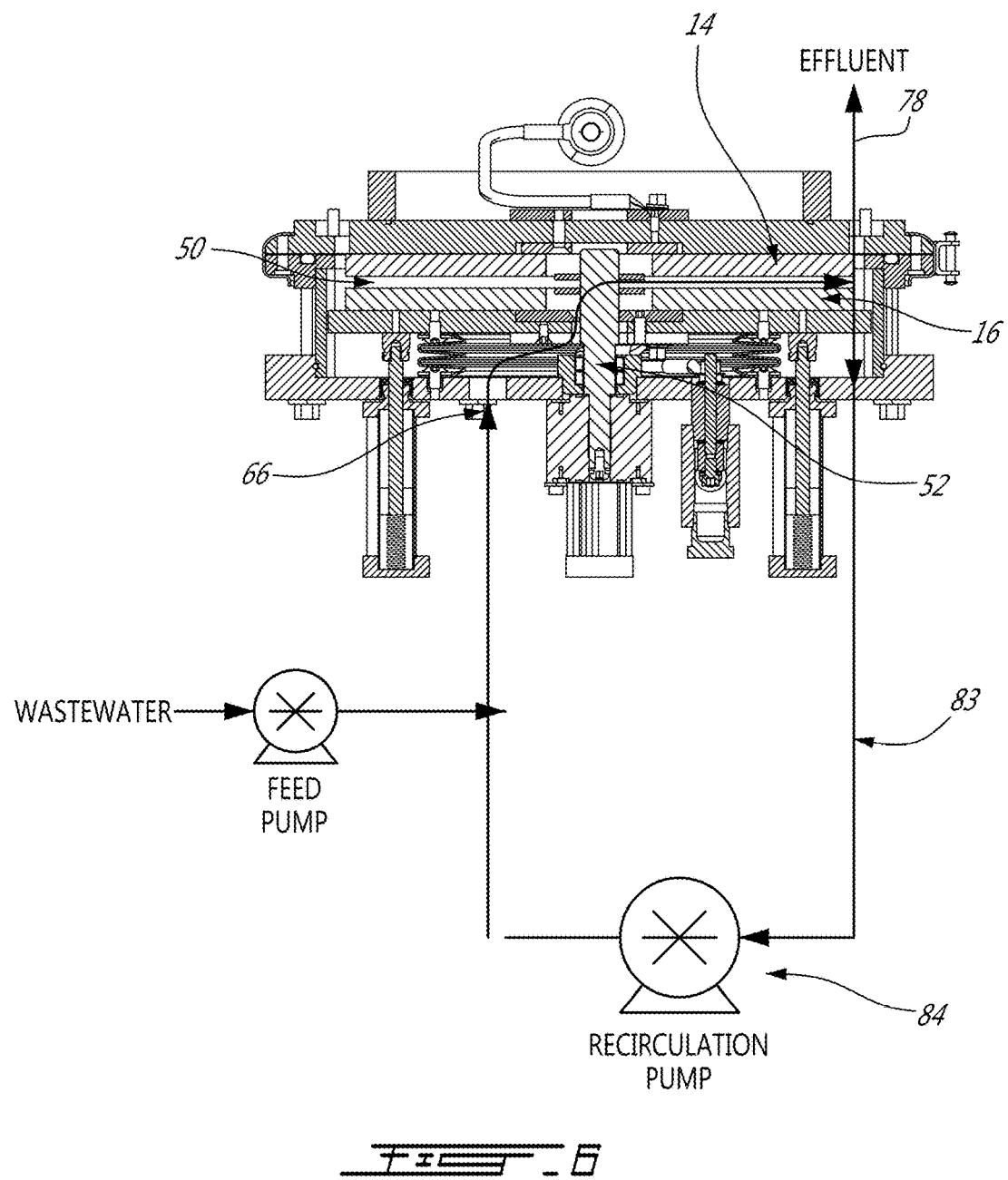
FIG. 6 is a schematic view of a wastewater recirculation loop in an electrode section of a device according to an embodiment of an aspect of the present invention.

A recirculation loop of wastewater is periodically or permanently activated in order to flush the electrode gap d and thus reduce electrode and wiper blade fouling and electrode passivation (see FIG. 6).

The electrical connection to the top electrode 14 may be via a connector through the side of the coagulation zone 12 then via a cable 80 to the electrode mounting plate 82. The electrical connection to the bottom electrode 16 may be through a connector 56 on the bottom of the coagulation zone 12, which is then fed through a flexible cable such that the electrode 16 can translate up.

The polarity of the electrodes 14, 16 may be reversed periodically with a 50% duty cycle and a period between 5 and 15 minutes for example depending on the contaminants concentration in the wastewater to treat: for highly concentrated wastewater, a 5 minutes period may be used and for weakly concentrated wastewater a 15 minutes period may be used for example.

The device 10 may be used as a marinized device for continuous electrochemical wastewater purification and continuous ejection of coagulated contaminants and wastewater sludge on board of a ship for example. Indeed, the provision of a narrow channeled flocculation chamber 24 minimizes effects of ship motion such as vibration, pitch and roll, and ensures efficient operation of the device in a range of inclination, up to 45 degrees for example, and in a range of motions relative to a centered vertical axis of device 10. The floc collection cone 28 capping the device also allows controllably discharging the flocs through the discharge port 30 even when the device is in an inclined position, without spillage of fluid regardless of ship motions. Moreover, the separator 32 as described hereinabove contributes to minimizing liquid movements within the device which may result from ship motion.

As mentioned hereinabove, the shape of the wiper blades 50 may be selected so as to allow a uniform distribution of the current density, i.e. electrical current divided by the electrode active surface area, along the electrode radius. With rectangular shaped blades, it was found that the surface of the electrodes located near the shaft 52 was consumed less rapidly than the surface of the electrodes located near the periphery of the electrodes, which in turn resulted in the wiper blades 50 eventually failing to be in close contact with the surface of the electrodes near the periphery of the electrodes while still being in close contact therewith near the center of the electrodes. To mitigate this situation, the wiper blades 50 may be designed to have a smaller surface area covering the inner electrode surface and a gradually larger surface area covering the peripheral electrode surfaces as can be seen in FIG. 3. This configuration allows gradually reducing the current density along the radius of the electrode and from the inner to the outer surface of the electrodes.

Moreover, in addition to distributing more uniformly the current density on the surface of the electrodes from the center to the outer edge thereof, such fan shape of the wiper blades 50 allows to constantly remove metal hydroxides from the electrode surface to prevent metal hydroxides from attaching to the electrode surface and eventually crystallizing and forming an oxide layer. Other functions of the wiper blades 50 are to remove other debris and foam formed by surfactants present in the wastewater as well as electrolytic bubbles (mainly hydrogen) accumulating in the inter-electrode gap d.

The wiper blades may be made by cutting from a plain sheet of material a pattern of several, i.e. typically 3 or 4, fan-shaped blades with a centered hole 51 in the middle for the shaft 52 to be inserted to allow the blade assembly rotation. The shape of the centered hole can be for instance hexagonal. The material of the blades 50 is selected to be of a material of the same hardness or harder than the material of the electrodes 14, 16. The blades material may be fiber glass reinforced plastic, carbon fiber reinforced plastic or any non-conductive material with a same hardness or a higher hardness than aluminium or iron used for the electrodes 14, 16 for instance. The centered hole 51 may be reinforced with two disks 53 cut out from the same material as the wiper blade 50 and attached to the blade 50 by use of an adhesive for example.

The rotating speed of the wiper blades is adjusted to maximize removal of metal hydroxide, debris, foam, and bubbles while minimizing potential abrasion of the electrodes and depends on the composition and concentration of the contaminants in the wastewater being treated. A blade rotating speed in a range between 4 and 15 rpm, depending on the wastewater strength, was found suitable, as shown for example in FIG. 4.

Figure 4:
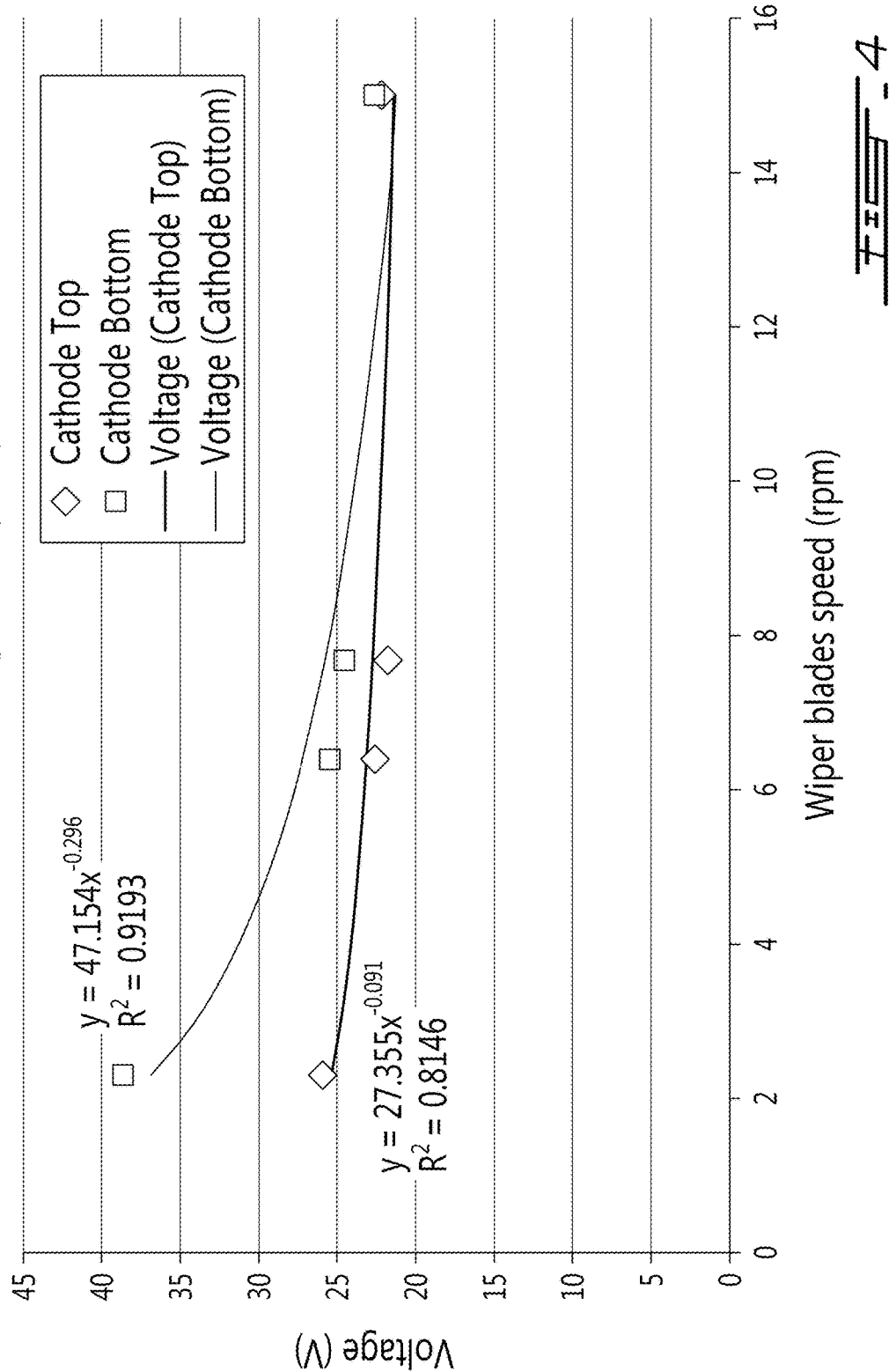
FIG. 4 shows the effect of the wiper blade rotational speed (rpm) on the voltage drop across two disc electrodes arranged horizontally in an electrode section and immersed in wastewater according to an embodiment of an aspect of the present invention.

The effect of the fan-shape wiper blades rotational speed on the cleanliness of the electrodes surface was studied using a device according to an embodiment of the invention, comprising two horizontal disk electrodes with a three fan-shaped wiper blades assembly. As can be seen in FIG. 4, the voltage applied to the electrodes to achieve a given current, when either the bottom or the top electrode is the cathode, for the case of a concentrated synthetic sewage recipe at a constant electrical conductivity of 2 mS/cm, is reduced to a same voltage value when the blades speed reaches 15 rpm. In the present system, the rotational speed of said wiper blades is comprised in a range between 4 and 15 rpm.

This indicates that the wiper blades provide sufficient mixing to eliminate compositional differences and stratification in the inter-electrode gap related to the position of the cathode. When the cathode, which generates the hydrogen bubbles, is on the top, the bubbles tend to float upwards and accumulate against the underside surface of the cathode, whereas when the cathode is on the bottom of the stack, such as occurs periodically when the polarity is reversed, the bubbles are generated from the upper surface of the cathode and bubble more easily through the wastewater, which can lead to foaming, which is not conducive to electrical flow if it builds up to any great extent.

Thus, when the wiper blade is at the optimal speed and the voltage is the same whether the cathode is the top electrode or the bottom electrode, it is clear that the mixture in the inter-electrode gap is no longer influenced by the position of the cathode.

This can be explained by the increase in resistance between the electrodes caused by the presence of aluminum hydroxides, non-conductive debris, foam, and bubbles, the behavior of the latter two being affected by the position of the cathode as just described hereinabove, or any insulation layer between the electrodes and that are being displaced by the rotational movement of the blades. Removing these substances in the inter-electrode gap helps preventing passivation of the electrodes by removing any passivation precursor and keeping the inter-electrode gap resistivity low.

Figure 5:
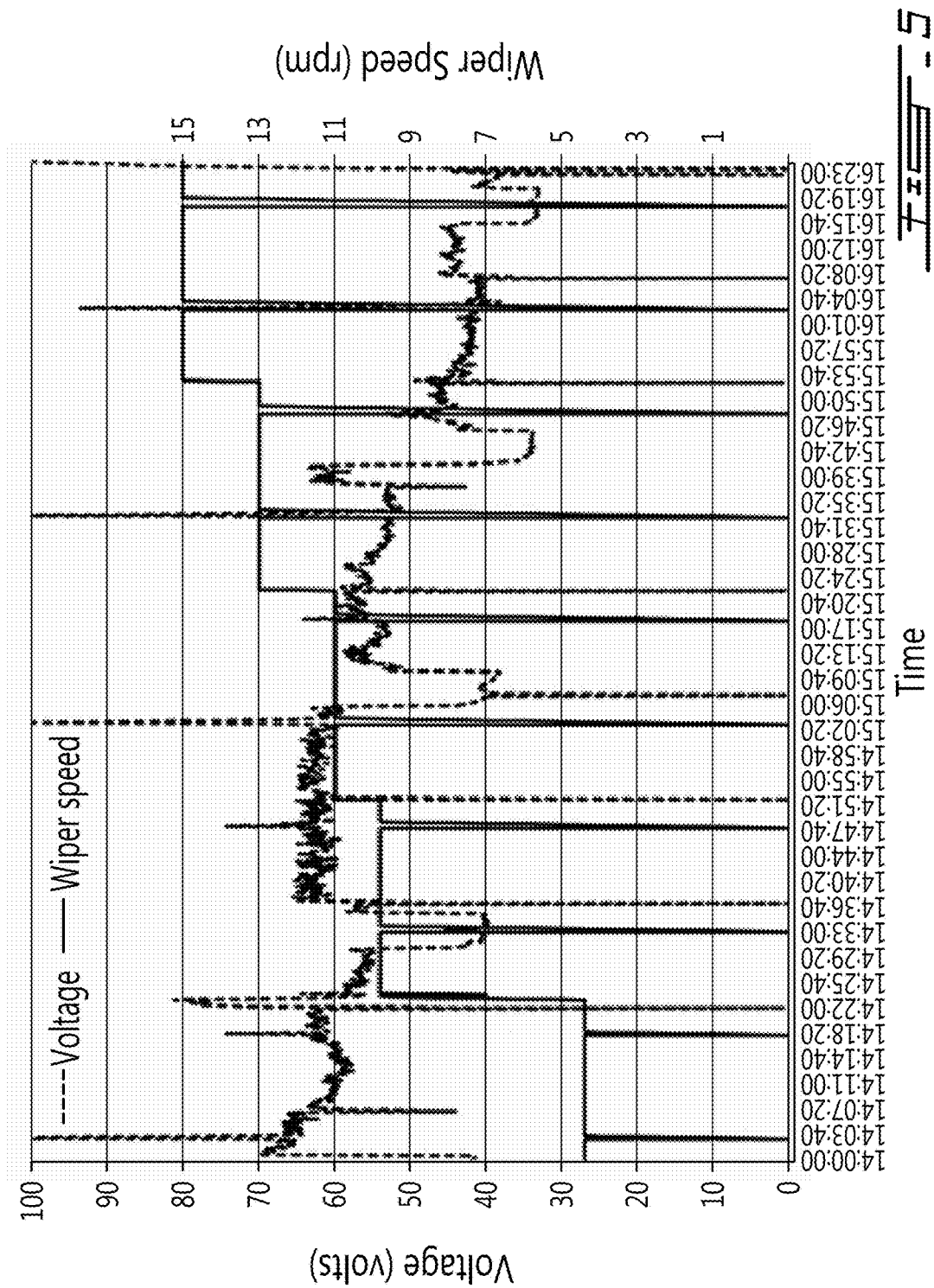
FIG. 5 shows the effect of the wiper blade rotational speed (rpm) on the voltage (V) across the two disc electrodes arranged horizontally in the electrode section immersed in wastewater according to an embodiment of an aspect of the present invention.

Another series of tests were conducted with another concentrated synthetic wastewater recipe to determine an optimal value for the wiper blades rotation speed. As can be seen in FIG. 5, by increasing the blades rotational speed from about 5 to about 15 rpm, the electrochemical voltage decreased by almost 30% with no observed effect on treatment performance as measured by reductions in total suspended solids and chemical oxygen demand.

As mentioned hereinabove, a wastewater recirculation loop 83, co-current to the main wastewater flow direction, may be used in the inter-electrode gap d as shown for example in FIG. 6, to further clean the edges of the blades not in contact with the surface of the electrodes 14, 16, so as to prevent hard debris from building up and accumulating thereon over time. A wastewater recirculation loop 83 according to an embodiment of an aspect of the invention is diagrammatically shown in FIG. 6. The wastewater is recirculated using a pump 84. The typical bulk wastewater velocity created by the wastewater recirculation in the inter-electrode gap d should be larger than the bulk velocity of the influent wastewater flowing in the inter-electrode gap and for instance it is 0.2 m/s in an embodiment with a wastewater feed rate of 1 liter per minute. The periodic cleaning of the blade edges using the wastewater recirculation loop keeps the active surface area of the electrodes 14, 16 maximized.

Figure 7B:
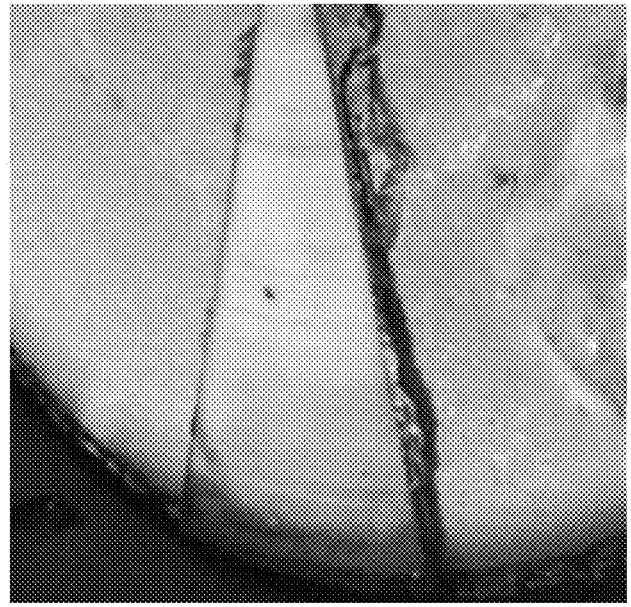
FIG. 7B shows a wiper blade with the wastewater recirculation loop in the inter-electrode gap according to an embodiment of an aspect of the present invention.
Figure 7A:
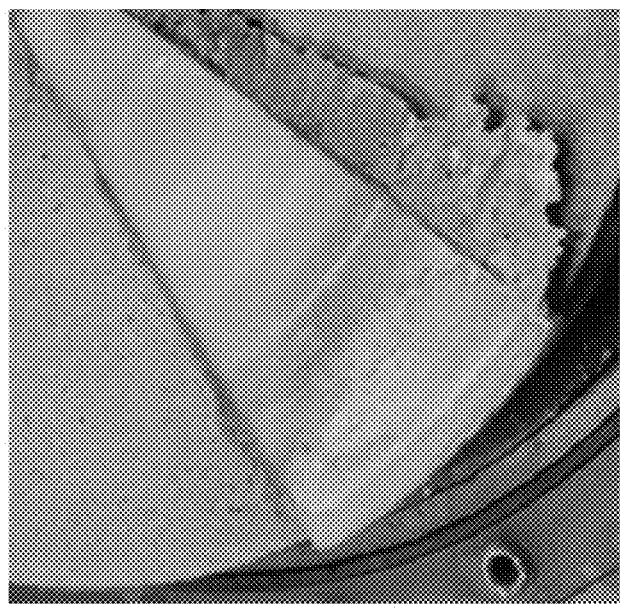
FIG. 7A shows a wiper blade without the wastewater recirculation loop in the inter-electrode gap according to an embodiment of an aspect of the present invention.

FIG. 7 show pictures of a blade part of a wiper blade assembly in a coagulation zone comprising two disc-shaped parallel horizontal electrodes, and which was opened after several hours of wastewater treatment, without (FIG. 7A) and with (FIG. 7B) a wastewater recirculation loop as described above. It can be seen that the wastewater recirculation in the inter-electrode gap removed debris from the blade edges. This was observed with 3 blade or 4 blade assemblies between the electrodes.

Figure 8:
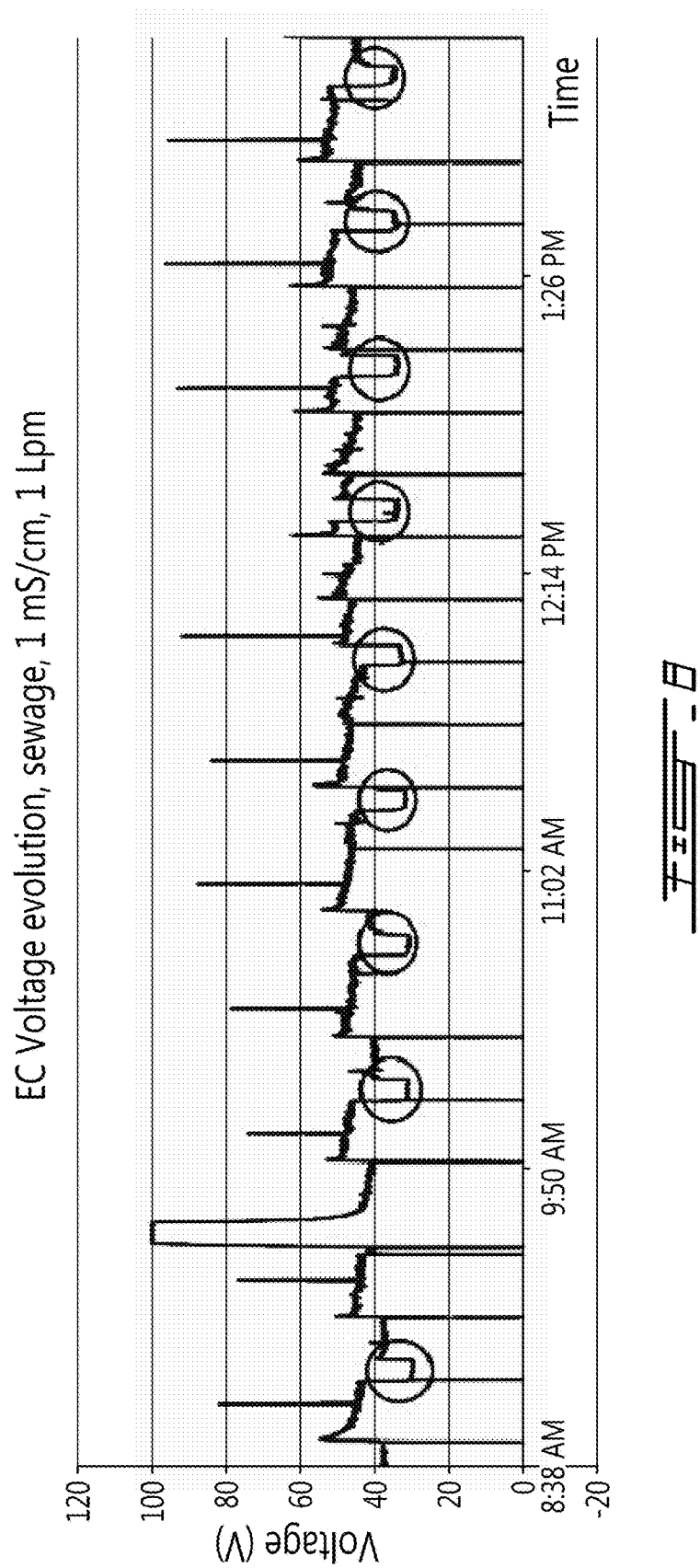
FIG. 8 shows the voltage across the electrodes with the wastewater recirculation loop in the inter-electrode gap, circles indicating when the recirculation is activated.

The effect of the wastewater recirculation loop 83 on the overall inter-electrode gap d electrical resistance was also studied. The inter-electrode gap d electrical resistance which affects the voltage required for a given electrical current may be used as an indicator of the presence of non-conductive materials, such as debris, foam, accumulating coagulant or coagulated contaminants, and bubbles, between the electrodes. An example of the positive effect of the wastewater recirculation loop 83 in the inter-electrode gap d is presented in FIG. 8, showing results of a test done while a synthetic wastewater recipe simulating sewage generated onboard a navy ship with a conductivity of 1 mS/cm was treated at a rate of 1 liter per minute and constant electrical current of 30 A applied to an coagulation zone comprising 2 disc parallel horizontal electrodes and a 3-wiper blade assembly, with a reversing polarity with a period of 15 minutes. The circles indicate the moment when the wastewater recirculation loop was activated. It can be seen that the voltage was significantly decreased during recirculation and came back to a voltage which was slightly lower than the initial voltage prior to the recirculation. This temporary effect of the wastewater recirculation loop in the inter-electrode gap indicates that the material accumulating in the inter-electrode gap is easy to remove and forms rapidly.

In another test, a wastewater was treated at a rate of 0.8 liter per minute, using a coagulation zone with a constant electrical current of 24 A and a polarity reversal duty cycle of 50% and a period of 5 minutes. When the cathode was at the top of the cartridge, the voltage measured across the electrodes was 30 V and when the cathode was at the bottom of the coagulation zone, the measured voltage across the electrodes was 55 V. With the cathode at the bottom and with the wastewater recirculation loop 83 valve half opened, the measured voltage dropped to 45 V from 55 V; with the wastewater recirculation loop 83 valve opened to ¾, the measured voltage dropped further down to 30 V and when the recirculation loop 83 valve was fully open, yielding a flow rate of about 30 liters per minute, the measured voltage dropped even lower to 21 V. When the wastewater recirculation was stopped for 10 seconds, the measured voltage increased back to 55 V when the cathode was at the bottom of the cartridge. With the cathode being the top electrode in the coagulation zone, the voltage reduced from 30 V to 19 V with the velocity wastewater recirculation loop 83 valve fully open.

The present device may be used for the treatment of wastewater generated by ships, such as bilge oily water, which contains free and emulsified oil, grease, surfactants, heavy metals, and other industrial contaminants generated from the ship and that can reach the ship bilge.

The present device may also be used to treat a ship-generated gray water (laundry, showers, sinks and kitchen, which contain elevated concentration of detergents, grease, oil, bacteria, organic matter, micro-organisms) and black water (mainly composed of feces, urine and toilet paper, which have very high concentration of organics, salts, nutrients such as phosphorus and nitrogen and micro-organisms), or a combination of gray water and black water.

The present device may also be used to treat wastewater streams generated from commercial or industrial operations.

In one exemplary application, the device according to the present invention was used to treat five batches of synthetic concentrated wastewater simulating real wastewater generated by a military operating base activities related to hygiene (shower, laundry), food services (kitchen) and latrine. Prior to treatment, the raw wastewater was partially treated in a lamella plate separator to remove large debris. Then, the wastewater was sent to the present device and its effluent characteristics were measured and the results are presented in FIG. 9, which indicates the water parameters of the influent wastewater entering the device and the treated wastewater effluent exiting the device.

As can be seen in FIG. 9, using the device according to the present invention to treat synthetic concentrated military forward operating base sewage, the average $BOD_5$ (indicated as BOD in FIG. 9) removal was on average 67%, the average COD removal was on average 69% and the TSS removal was on average of 87%. Cleary, the single compact electrochemical purification device is efficient in treating wastewater by separating and rejecting the majority of contaminants leading to BOD, COD and TSS at least comparable to those obtained with standard systems using residence times that are much shorter than those for typical physico-chemical treatment in conventional wastewater treatment systems and methods.

In another example, a device according to the present invention was used to treat real bilge oily water generated from ships as well as concentrated synthetic oily water. The total oil and grease (TOG) in oily water includes several forms, such as free oil and emulsified oil, based primarily on the size of oil droplets and the miscibility of the oil in water. Dispersed, i. e. very small droplets in water that take a long time to float and therefore stay in water and are difficult to treat, and emulsified form, i.e. oil droplets smaller than 20 µm, are the hardest to treat because their neutral buoyancy makes it difficult to separate by gravity alone. In the experiment, the bilge oily water was first treated in a free oil media separator in order to remove the free oil and grease. The partially treated effluent with only emulsified oil and grease (EOG) was then treated using a device according to the present invention. As can be seen in the FIG. 10, 99.8% of the emulsified oil and grease (EOG) was removed from raw oily water containing between 1190 and 2660 ppm EOG. It can be seen that the device of the present invention is able to very effectively remove EOG.

The present device allows the efficient treatment of wastewater by electrocoagulation, flocculation, flotation, and separation and ejection of buoyant as well as non-buoyant contaminants in a single closed reactor. The present device is a highly effective, electrochemical reactor that continuously purifies wastewater and collects, separates and ejects coagulated contaminants as a froth and non-buoyant contaminants as a sludge, in a continuous process. The device can be fully-automated and marinized. The purification and contaminant removal are achieved using only electrochemical processes without any added chemicals. No additional equipment external to the device is required to separate contaminants in order to achieve the high removal rates presented herein.

Fan-shape wiper blades may be used for the continuous cleaning of the surface of the electrodes of the device. A constant inter-electrode gap is maintained, and a wastewater recirculation loop may be further provided for cleaning of the blades edges. Electrodes may be monitored for passivation, allowing operation under relatively high current density which minimizes the electrode surface area required to treat highly contaminated wastewaters. The mechanical configuration allows operation on marine platforms as the device is closed with a cone-shaped top, and a narrow and elongated enclosed flocculation chamber prevents marine motion from affecting hydrodynamic processes within the device.

There is thus provided a device for the electrochemical treatment of wastewaters including gray water, black water, oily water and a combination thereof, i.e. sewage, as well as industrial and commercial wastewaters for instance wash water generated by the cosmetic industry or garages.

The present combination of electrode cleaning mechanisms, including polarity reversal, a wiper blade acting in constant contact with the anode and cathode, and a periodic wastewater recirculation are effective at removing debris, deposits, foams, gas bubble and ions from the electrode surfaces and the wiper blade edges without human intervention. These cleaning mechanisms have been found to greatly prevent or delay passivation of the electrodes.

There is thus provided a compact device, generally integrating and combining four zones, i.e. a coagulation zone, a flocculation chamber, a flotation zone and a separation zone, the flocculation chamber being in fluid communication with the coagulation zone, and receiving coagulants formed in the coagulation zone, the flotation zone above said flocculation chamber comprising a discharge port for collection of light solid particles, a separation zone being in fluid communication with the flotation zone and comprising a separator allowing non-buoyant contaminants separation and a sludge collector allowing collection of sludge and heavy solid particles. The present combination provides the conditions to carry out effective mixing of coagulant in the coagulation zone, optimal gentle mixing to promote flocculation in the flocculation zone using a greatly reduced flocculation time, as well as effective and rapid flotation of the flocs created in the flocculation zone.

The present device was shown to provide efficient wastewater purification and contaminant removal in a single unit that is not affected by ship motion and which also includes fully-automated and integrated cleaning mechanisms for the electrode surfaces.

There is thus provided a highly effective, fully-automated marinized electrochemical reactor that continuously purifies wastewater and collects, separates and ejects coagulated contaminants and sludge.

The applications of the present device are numerous and include the treatment of shipboard-generated wastewaters, the treatment of gray water and black water or a combination of these, as generated by households, communities, hotels, resorts, military bases and work camps.

The scope of the claims should not be limited by the embodiments set forth in the examples, but should be given the broadest interpretation consistent with the description as a whole.

The invention claimed is:

1. An integrated device for wastewater purification, comprising:
    a coagulation zone, comprising a feed port for the wastewater to enter the device;
    a flocculation zone connected to and in fluid communication with said coagulation zone;
    a flotation zone connected to and in fluid communication with said flocculation zone and comprising a froth discharge port; and
    a separation zone below and in fluid communication with said flotation zone and comprising a contaminant separator and a purified wastewater discharge port;
    wherein the wastewater entering the device through said feed port is mixed with electrolytically-generated coagulants and gas bubbles in said coagulation zone; said flocculation zone receives and gently mixes coagulated wastewater contaminants and gas bubbles formed in said coagulation zone and aggregates them into flocs before flotation of buoyant flocs in said flotation zone; said separation zone being adapted for further floc formation, oil coalescence, settling and discharge of non-buoyant contaminants; and
    said separator comprising a series of concentric and truncated upward pointing cones below the flotation zone.

2. The device of claim 1, wherein said coagulation zone comprises a top electrode and a bottom electrode separated by a constant inter-electrode gap, and an annular gap at a peripheral outer edge of the electrodes; said flocculation zone comprises an annular flocculation zone being in continuity with the annular gap at the peripheral outer edge of the electrodes to receive and mix said coagulated wastewater contaminants and gas bubbles formed in said inter-electrode gap.

3. The device of claim 1, wherein said coagulation zone comprises a top electrode and a bottom electrode separated by a constant inter-electrode gap, and an annular gap at a peripheral outer edge of the electrodes; said flocculation zone comprises an annular flocculation zone being a narrow chamber extending up from said coagulation zone in continuity with the annular gap at the peripheral outer edge of the electrodes to receive and mix said coagulated wastewater contaminants and gas bubbles formed in said inter-electrode gap.

4. The device of claim 2, wherein said separation zone comprises a separator, and wherein upon application of an electric potential to the electrodes, the wastewater received through said feed port is submitted to coagulation in said coagulation zone and then to flocculation on its way up through said flocculation zone, a part of the formed flocs exiting said flocculation zone floating up towards said froth discharge port, while a remaining part of the formed flocs and the non-buoyant contaminants are entrained downwards to said separator, said separator being adapted for contaminant aggregation, floc formation and settlement of non-buoyant contaminants as a sludge.

5. The device of claim 3, wherein upon application of an electric potential to the electrodes, the wastewater received through said feed port is submitted to coagulation in said coagulation zone and then to flocculation on its way up through said flocculation zone, a part of the formed flocs exiting said flocculation zone floating up towards said froth discharge port, while a remaining part of the formed flocs and the non-buoyant contaminants are entrained downwards to said separator, said separator being adapted for contaminant aggregation, floc formation and settlement of non-buoyant contaminants as a sludge.

6. The device of claim 1, wherein said coagulation zone comprises a top electrode and a bottom electrode separated by an inter-electrode gap, and a wiper blade assembly within said inter-electrode gap.

7. The device of claim 1, wherein said coagulation zone comprises a top electrode and a spring-loaded bottom electrode, separated by an inter-electrode gap, and a wiper blade assembly within said inter-electrode gap.

8. The device of claim 2, further comprising a wastewater recirculation loop within the inter-electrode gap.

9. The device of claim 3, further comprising a wastewater recirculation loop within the inter-electrode gap.

10. The device of claim 1, wherein said coagulation zone comprises a top electrode and a bottom electrode separated by an inter-electrode gap, and a wiper blade assembly within said inter-electrode gap, said wiper blade assembly comprising fan-shaped wiper blades.

11. The device of claim 1, wherein said coagulation zone comprises a top electrode and a bottom electrode separated by an inter-electrode gap, and a wiper blade assembly within said inter-electrode gap, said wiper blade assembly comprising fan-shaped wiper blades, and a rotational speed of said wiper blades is comprised in a range between 4 and 15 rpm.

12. The device of claim 1, wherein a residence time in said coagulation zone is about 5 s and a residence time in said flocculation zone is about 115 s.

13. A marinized integrated device for onboard wastewater purification, comprising:
- a coagulation zone, comprising a feed port for the wastewater to enter the device;
- a flocculation zone connected to and in fluid communication with said coagulation zone; a flotation zone connected to and in fluid communication with said flocculation zone; and
- a separation zone below and in fluid communication with said flotation zone and comprising a contaminant separator and a purified wastewater discharge port;
- wherein said flocculation zone comprises an annular flocculation zone having a narrow chamber extending up from said coagulation zone; said flotation zone comprises a floc collection cone for collecting flocs formed by the annular flocculation zone, the flocs being periodically discharged from said collection cone; and said contaminant separator comprises a series of concentric and truncated upward pointing cones, below the flotation zone.

* * * * *